(12) United States Patent
Iwase et al.

(10) Patent No.: US 8,187,143 B2
(45) Date of Patent: May 29, 2012

(54) CONTROL APPARATUS FOR VEHICULAR DRIVE SYSTEM

(75) Inventors: Yuji Iwase, Mishima (JP); Tooru Matsubara, Toyota (JP); Hiroyuki Shibata, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1036 days.

(21) Appl. No.: 12/153,985

(22) Filed: May 28, 2008

(65) Prior Publication Data
US 2009/0017983 A1 Jan. 15, 2009

(30) Foreign Application Priority Data
May 29, 2007 (JP) .................................. 2007-142494

(51) Int. Cl.
B60K 6/36 (2007.10)
(52) U.S. Cl. ............................................................ 477/3
(58) Field of Classification Search .................. 475/150, 475/153; 477/3, 906, 907
See application file for complete search history.

(56) References Cited

U.S. PATENT DOCUMENTS

| | | | | |
|---|---|---|---|---|
| 5,757,161 A * | 5/1998 | Ikkai et al. | .................. | 318/719 |
| 5,921,885 A * | 7/1999 | Tabata et al. | .................. | 477/107 |
| 5,923,728 A * | 7/1999 | Ikkai et al. | .................. | 318/807 |
| 6,146,302 A * | 11/2000 | Kashiwase | .................. | 475/5 |
| 6,288,515 B1 * | 9/2001 | Hiti et al. | .................. | 318/722 |
| 6,302,230 B1 * | 10/2001 | Kamen et al. | .................. | 180/171 |
| 6,324,038 B1 * | 11/2001 | Kishibe et al. | .................. | 361/31 |
| 6,334,038 B1 * | 12/2001 | Kawahara | .................. | 399/274 |
| 6,339,741 B1 * | 1/2002 | Ritter et al. | .................. | 701/110 |
| 6,383,106 B1 | 5/2002 | Kashiwase | | |
| 7,149,620 B2 * | 12/2006 | Kishibata et al. | ............. | 701/110 |
| 7,223,200 B2 | 5/2007 | Kojima et al. | | |
| 7,824,578 B2 * | 11/2010 | Lee et al. | .................. | 252/500 |
| 7,834,578 B2 | 11/2010 | Sato | | |
| 2002/0091028 A1 | 7/2002 | Kashiwase | | |
| 2004/0226785 A1 * | 11/2004 | Sugimura | .................. | 188/182 |
| 2009/0062060 A1 * | 3/2009 | Rink | .................. | 477/4 |

FOREIGN PATENT DOCUMENTS

| | | |
|---|---|---|
| JP | U-64-18664 | 1/1989 |
| JP | A-8-82354 | 3/1996 |
| JP | A-11-13870 | 1/1999 |
| JP | A-11-217025 | 8/1999 |

(Continued)

OTHER PUBLICATIONS

Japanese Office Action issued on Dec. 1, 2009 in Japanese Patent Application No. 2007-142494 (with translation).

(Continued)

Primary Examiner — J. Allen Shriver, II
Assistant Examiner — James Triggs
(74) Attorney, Agent, or Firm — Oliff & Berridge, PLC

(57) ABSTRACT

A control apparatus for a vehicular drive system including (a) an internal combustion engine, and (b) a first transmission portion and a second transmission portion disposed in a power transmitting path between the internal combustion engine and a drive wheel of a vehicle, the first transmission portion having an electrically controlled differential portion which includes a first electric motor and a differential state of which is controllable by controlling an operating state of the first electric motor, the control apparatus includes an internal-combustion-engine control portion configured to change an operating state of the internal combustion engine when it is determined that a shifting action of the second transmission portion is abnormal.

9 Claims, 9 Drawing Sheets

FOREIGN PATENT DOCUMENTS

| | | | |
|---|---|---|---|
| JP | 2000166013 | * | 6/2000 |
| JP | A-2000-166013 | | 6/2000 |
| JP | A 2002-135909 | | 5/2002 |
| JP | A-2003-130202 | | 5/2003 |
| JP | A-2005-9590 | | 1/2005 |
| JP | A 2005-240891 | | 9/2005 |
| JP | A-2005-313865 | | 11/2005 |
| JP | A-2005-318780 | | 11/2005 |
| JP | A-2006-347240 | | 12/2006 |
| WO | WO 2006/095497 A1 | | 9/2006 |

OTHER PUBLICATIONS

Mar. 2, 2010 Office Action issued in Japanese Patent Application No. 2007-142494 (with translation).

Office Action issued in corresponding Japanese Application No. 2007-142494 on Jan. 4, 2011 with English-language translation.

* cited by examiner

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

CONTROL APPARATUS FOR VEHICULAR DRIVE SYSTEM

CROSS REFERENCE TO RELATED APPLICATION

The present application claims priority from Japanese Patent Application No. 2007-142494, which was filed on May 29, 2007, the disclosure of which is herein incorporated by reference in its entirety.

BACKGROUND OF THE INVENTION

1. Field of the Invention

The present invention relates in general to a control apparatus for a vehicular drive system, and more particularly to techniques for reducing or eliminating a risk of an adverse influence of an abnormal shifting action on the durability of the vehicular drive system.

2. Discussion of Prior Art

There is known a control apparatus for a drive system of a hybrid vehicle including a continuously-variable transmission having an electric motor, and a step-variable transmission connected to the continuously-variable transmission, which control apparatus is configured to control an operating state of the electric motor for continuously changing an input speed of the step-variable transmission while the step-variable transmission is placed in a selected one of gear positions, so that an overall speed ratio of the hybrid vehicle drive system is variable over a wide range. JP-2005-240891A discloses an example of this type of control apparatus.

According to the control apparatus disclosed in the above-identified publication is arranged such that the input speed of the step-variable transmission is determined by the operating speed of the electric motor and the operating speed of an internal combustion engine connected to the continuously-variable transmission, in other words, the operating speed of the electric motor changes with a change of the operating speed of the input speed of the step-variable transmission. Accordingly, an abnormal shifting action of the step-variable transmission due to some abnormality thereof causes an abnormal input speed of the step-variable transmission, which in turn gives rise to a risk of an abnormal operating speed of the electric motor, resulting in an adverse influence on the durability of the electric motor.

SUMMARY OF THE INVENTION

The present invention was made in view of the background art described above. It is therefore an object of this invention to provide a control apparatus for a vehicular drive system including an electric motor and a step-variable transmission, which control apparatus is configured to reduce a risk of an adverse influence of an abnormal shifting action of the step-variable transmission on the durability of the electric motor.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a vehicular drive system including (a) an internal combustion engine, and (b) a first transmission portion and a second transmission portion disposed in a power transmitting path between the internal combustion engine and a drive wheel of a vehicle, the first transmission portion having an electrically controlled differential portion which includes a first electric motor and a differential state of which is controllable by controlling an operating state of the first electric motor, the control apparatus comprising an internal-combustion-engine control portion configured to change an operating state of the internal combustion engine when it is determined that a shifting action of the second transmission portion is abnormal.

In the control apparatus of the above-described mode (1) according to a first aspect of the present invention, the operating state of the internal combustion engine is changed when the shifting action of the second transmission portion is determined to be abnormal. A change of the operating state of the internal combustion engine reduces or eliminates a risk of an abnormal or excessive rise of the operating speed of the first electric motor due to the abnormal shifting action of the second transmission portion, which rise would adversely influence the durability of the first electric motor.

(2) The control apparatus according to the above-described mode (1), the internal-combustion-engine control portion changes the operating state of the internal combustion engine when an amount of opening of a throttle valve of the internal combustion engine or an amount of operation of a vehicle accelerating member is larger than a predetermined upper limit while it is determined that the shifting action of the second transmission portion is abnormal.

In the above-described mode (2) of the invention, the operating state of the internal combustion engine is changed when there is a relatively high risk of an excessive rise of the operating speed of the first electric motor due to the abnormal shifting action of the second transmission portion, that is, when the opening amount of the throttle valve or the operation amount of the vehicle accelerating member (e.g., an accelerator pedal) is larger than the upper limit. It is noted that the operating speed of the first electric motor tends to rise with an increase of the opening amount of the throttle valve or the operation amount of the vehicle accelerating member. Thus, the present mode of the invention can effectively reduce or eliminate the risk of an adverse influence of the abnormal shifting action of the second transmission portion on the durability of the first electric motor.

(3) The control apparatus according to the above-described mode (2), wherein the internal-combustion-engine control portion changes the operating state of the internal combustion engine such that an amount of reduction of an input speed of the first transmission portion increases with an increase of the amount of opening of the throttle valve or the amount of operation of the vehicle accelerating member.

In the above-described mode (3) of this invention, the degree of reduction of the risk of an excessive rise of the operating speed of the first electric motor by changing the operating state of the internal combustion engine increases with an increase of the risk, so that the risk of the adverse influence of the abnormal shifting action of the second transmission portion on the durability of the first electric motor can be effectively reduced or eliminated.

(4) The control apparatus according to any one of the above-described modes (1)-(3), further comprising a shifting-action determining portion configured to determine that the shifting action of the second transmission portion is abnormal when an amount of change of a speed ratio of the second transmission portion caused by the shifting action is larger than a nominal value obtained where the second transmission portion is normally operable.

In the above-described mode (4), the control apparatus further includes the shifting-action determining portion which determines that the shifting action of the second transmission portion is abnormal when the amount of change of the speed ratio of the second transmission portion caused by the shifting action is larger than the nominal value obtained where the second transmission portion is normally operable. Thus, the internal-combustion-engine control portion changes the operating state of the internal combustion engine only when there is a relatively high risk of an excessive rise of the operating speed of the first electric motor, so that the control load of the control apparatus can be reduced.

(5) The control apparatus according to any one of the above-described modes (1)-(4), wherein the internal-combustion-engine control portion changes the operating state of the internal combustion engine so as to reduce an input speed of the first transmission portion when it is determined that the shifting action of the second transmission portion is abnormal.

In the above-described mode (5) of the present invention, the operating state of the internal combustion engine is changed so as to reduce the input speed of the first transmission portion when the shifting action of the second transmission portion is determined to be abnormal. The reduction of the input speed of the first transmission portion results in reduction of the operating speed of the first electric motor, thereby making it possible to reduce or eliminate the risk of an excessive rise of the operating speed of the first electric motor.

(6) The control apparatus according to any one of the above-described mode (5), wherein the internal-combustion-engine control portion changes the operating state of the internal combustion engine such that an amount of reduction of the input speed of the first transmission portion increases with an increase of the input speed.

In the above-described mode (6), the operating state of the internal combustion engine is changed such that the amount of reduction of the input speed of the first transmission portion increases with an increase of the input speed, so that the degree of reduction of the risk of an excessive rise of the operating speed of the first electric motor by changing the operating state of the internal combustion engine increases with an increase of the risk, so that the risk of the adverse influence of the abnormal shifting action of the second transmission portion on the durability of the first electric motor can be effectively reduced or eliminated.

(7) The control apparatus according to any one of the above-described modes (1)-(6), wherein the internal-combustion-engine control portion changes the operating state of the internal combustion engine when an input speed of the first transmission portion is equal to or higher than a predetermined upper limit while it is determined that the shifting action of the second transmission portion is abnormal.

In the above-described mode (7) wherein the operating state of the internal combustion engine is changed when the input speed of the first transmission portion is equal to or higher than the upper limit, that is, when there is a relatively high risk of an excessive rise of the operating speed of the first electric motor due to the abnormal shifting action of the second transmission portion. Thus, the present mode of the invention can effectively reduce or eliminate the risk of an adverse influence of the abnormal shifting action of the second transmission portion on the durability of the first electric motor.

(8) The control apparatus according to the above-described mode (7), wherein the predetermined upper limit of the operating speed of the first transmission portion is determined such that the predetermined upper limit decreases with an increase of an amount of reduction of a speed ratio of the second transmission portion.

In the above-described mode (8), an opportunity of changing the operating state of the internal combustion engine increases with an increase of a risk of an excessive rise of the operating speed of the first electric motor, so that the operating state of the internal combustion engine is changed as needed, making it possible to reduce or eliminate the risk of an adverse influence of the abnormal shifting action of the second transmission portion on the durability of the first electric motor.

(9) The control apparatus according to any one of the above-described modes (1)-(8), the internal-combustion-engine control portion changes the operating state of the internal combustion engine when it is determined that a shift-up action of the second transmission portion which causes a drop of a speed ratio of the second transmission portion is abnormal.

In the control apparatus of the above-described mode (9), the operation of the internal-combustion-engine control portion is based on an arrangement in which a drop of the speed ratio of the second transmission portion causes a rise of the operating speed of the first electric motor. In other words, the internal-combustion-engine control portion changes the operating state of the internal combustion engine only when there is a high risk of a rise of the operating speed of the first electric motor due to the drop of the speed ratio caused by the shift-up action of the second transmission portion, so that the control load of the control apparatus can be reduced.

(10) The control apparatus according to any one of the above-described modes (1)-(9), wherein the vehicular drive system further includes (c) a second electric motor, and the electrically controlled differential portion includes a planetary gear mechanism having a first rotary element operatively connected to the internal combustion engine, a second rotary element operatively connected to the first electric motor, and a third rotary element operatively connected to the second electric motor and the second transmission portion, and wherein the electrically controlled differential portion is operable as an electrically controlled continuously-variable transmission portion a speed ratio of which is electrically continuously variable while the first and second electric motors are electrically connected to each other.

In the above-described mode (10), the electrically controlled differential portion of the first transmission portion is operable as a continuously-variable transmission portion the speed ratio of which is electrically continuously variable, so that the first and second transmission portions cooperate to constitute a continuously variable transmission capable of smoothly changing the vehicle drive torque. It is noted that the electrically controlled differential portion is operable not only as the electrically controlled continuously-variable transmission portion, but also as a step-variable transmission portion the speed ratio of which is variable in steps.

(11) The control apparatus according to any one of the above-described modes (1)-(10), wherein the second transmission portion is a step-variable automatic transmission a speed ratio of which is automatically variable.

In the above-described mode (11) wherein the second transmission portion is a step-variable automatic transmission, the speed ratio of the second transmission can be varied over a relatively wide range, and a burden on the vehicle operator in controlling the vehicular drive system can be reduced.

(12) The control apparatus according to any one of the above-described modes (1)-(11), wherein an output of the first transmission portion is input to the second transmission portion.

In the above-described mode (12) wherein the output of the first transmission portion is input to the second transmission portion, a vehicle drive torque generated by the internal combustion engine which is increased by the second transmission portion is not input to the first transmission portion. Accordingly, the required torque capacity of the first transmission portion can be made smaller than when the output of the second transmission portion is input to the first transmission portion, so that the first transmission portion including the electrically controlled differential portion can be small-sized.

BRIEF DESCRIPTION OF THE DRAWINGS

The above and other objects, features, advantages, and technical and industrial significance of this invention will be better understood by reading the following detailed description of preferred embodiments of the present invention, when considered in connection with the accompanying drawings, in which.

DETAILED DESCRIPTION OF THE PREFERRED EMBODIMENT

First Embodiment

Figures 1, 2:
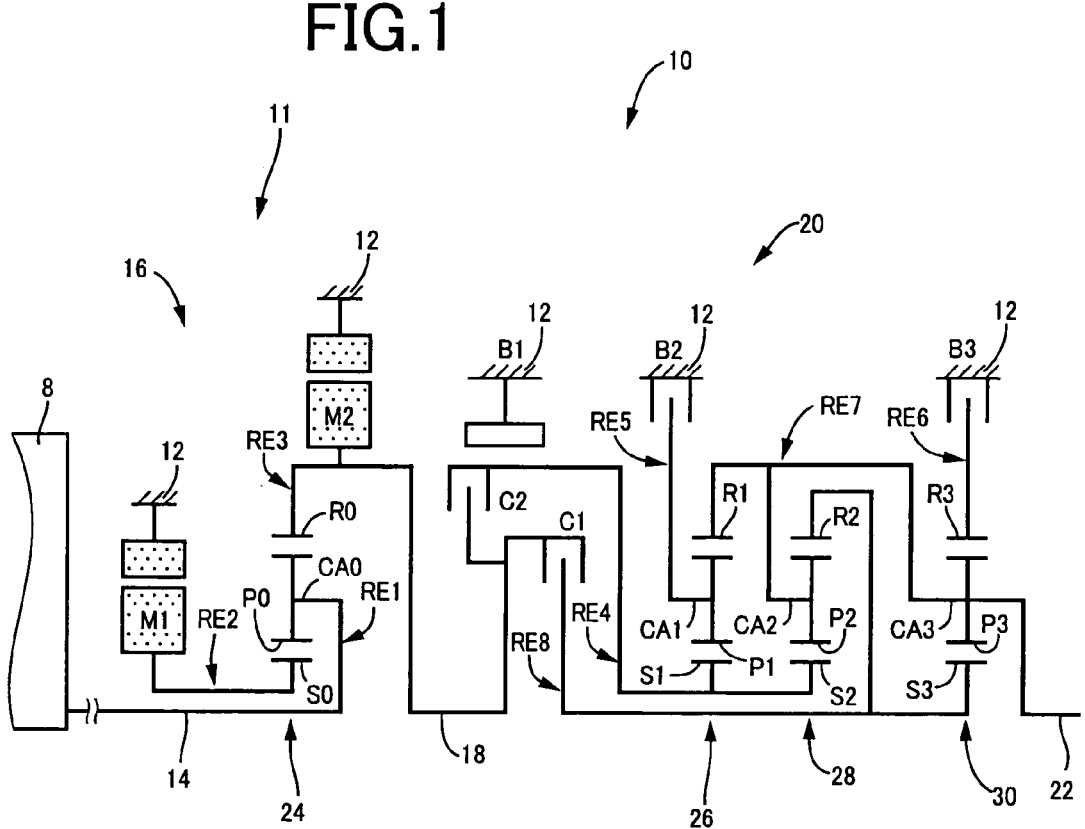
FIG. 1 is a schematic view showing an arrangement of a drive system of a hybrid vehicle, which is controlled by a control apparatus constructed according to the principle of this invention.
FIG. 2 is a table indicating shifting actions of an automatic transmission portion provided in the drive system of FIG. 1, in relation to different combinations of operating states of hydraulically operated frictional coupling devices to effect the respective shifting actions.
Figure 7:
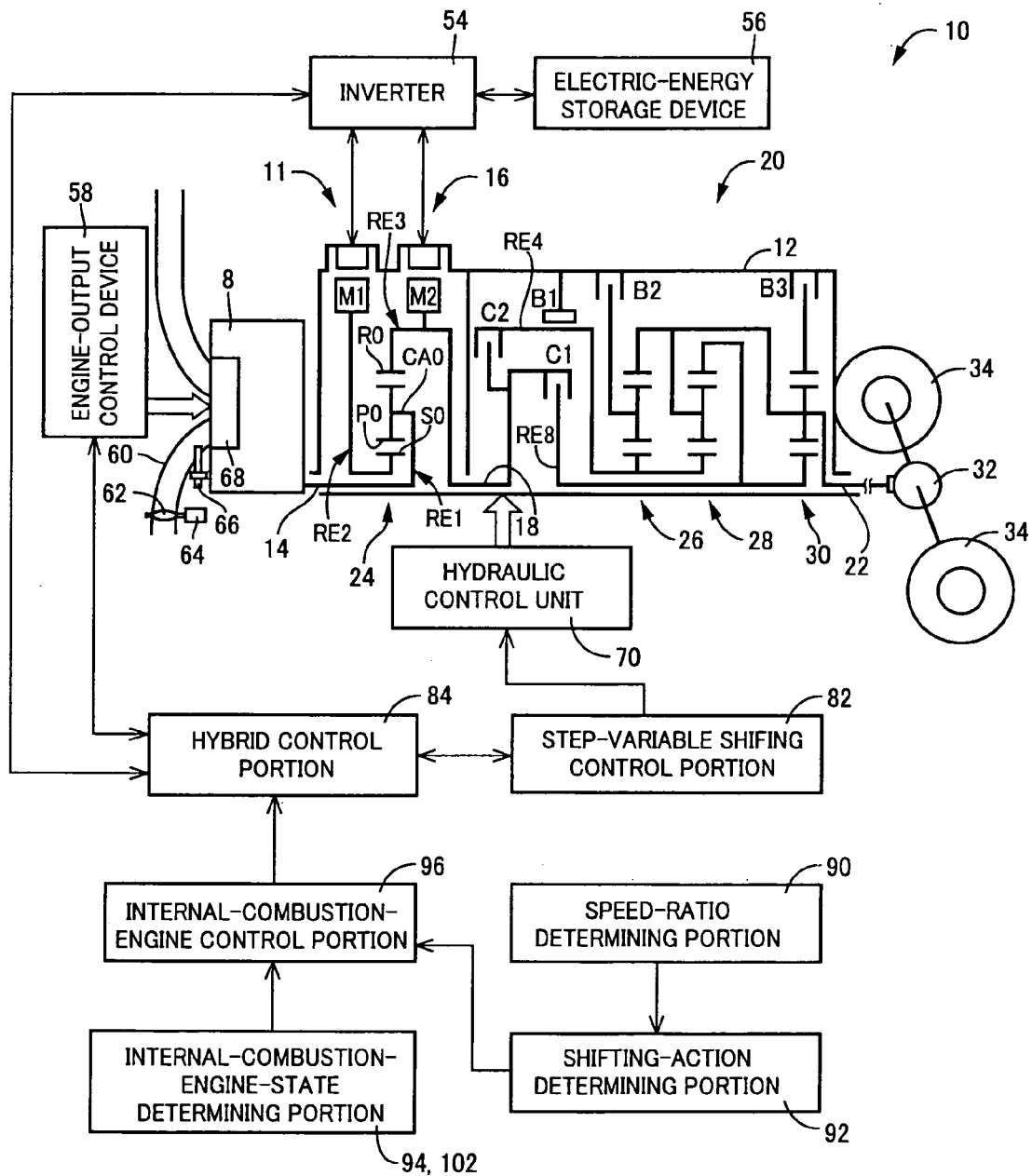
FIG. 7 is a functional block diagram illustrating major control functions of the electronic control device of FIG. 4.

Referring first to the schematic view of FIG. 1, there is shown a transmission mechanism 10 constituting a part of a drive system for a hybrid vehicle, which drive system is controlled by a control apparatus constructed according to a first embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. his is also true to the other embodiments of the invention described below.

The differential portion 11, which functions as a first transmission portion and an electrically controlled differential portion, includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as a major component, a planetary gear set 24 of a single pinion type having a gear ratio ρ1 of about 0.418, for example. The planetary gear set 24, which is a planetary gear mechanism, has rotary elements consisting of: a sun gear S0, a planetary gear P0; a carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio ρ0 is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The power distributing mechanism 16 constructed as described above is operated in a differential state in which three elements of the planetary gear set 24 consisting of the sun gear S0, carrier CA0 and ring gear R0 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0min to a maximum value γ0max, that is, in the continuously-variable shifting state in which the differential portion 11 functions as an electrically controlled continuously-variable transmission the speed ratio γ0 of which is continuously variable from the minimum value γ0min to the maximum value γ0max. Thus, the differential portion 11 functions as a continuously-variable transmission mechanism wherein a differential state between the rotating speed of the input shaft 14 and the rotating speed of the power transmitting member 18 functioning as the output shaft of the differential portion 11 is controlled by controlling the operating states of the first electric motor M1, second electric motor M2 and engine 8 that are operatively connected to the power distributing mechanism 16.

The automatic transmission portion 20, which functions as a second transmission portion, constitutes a part of a power transmitting path between the differential portion 11 and the drive wheels 34. The automatic transmission portion 20 includes a single-pinion type first planetary gear set 26, a single-pinion type second planetary gear set 28 and a single-pinion type third planetary gear set 30. Thus, the automatic transmission portion 20 is a multiple-step transmission of a planetary gear type. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio ρ1 of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio ρ2 of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio ρ3 of about 0.421. Where the numbers of teeth of the first sun gear S1, first ring gear R1, second sun gear S2, second ring gear R2, third sun gear S3 and third ring gear R3 are represented by ZS1, ZR1, ZS2, ZR2, ZS3 and ZR3, respectively, the above-indicated gear ratios ρ1, ρ2 and ρ3 are represented by ZS1/ZR1, ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a first clutch C1, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 20 (power transmitting path between the differential portion 11 or power transmitting member 18 and the drive wheels 34), to a selected one of a power transmitting state in which a vehicle drive force can be transmitted through the power transmitting path, and a power cut-off state (non-power-transmitting state) in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state. It will be understood that the first and second clutches C1, C2 function as a switching portion operable to switch the power transmitting path between the differential portion 11 and the drive wheels 34, between the power transmitting state and the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
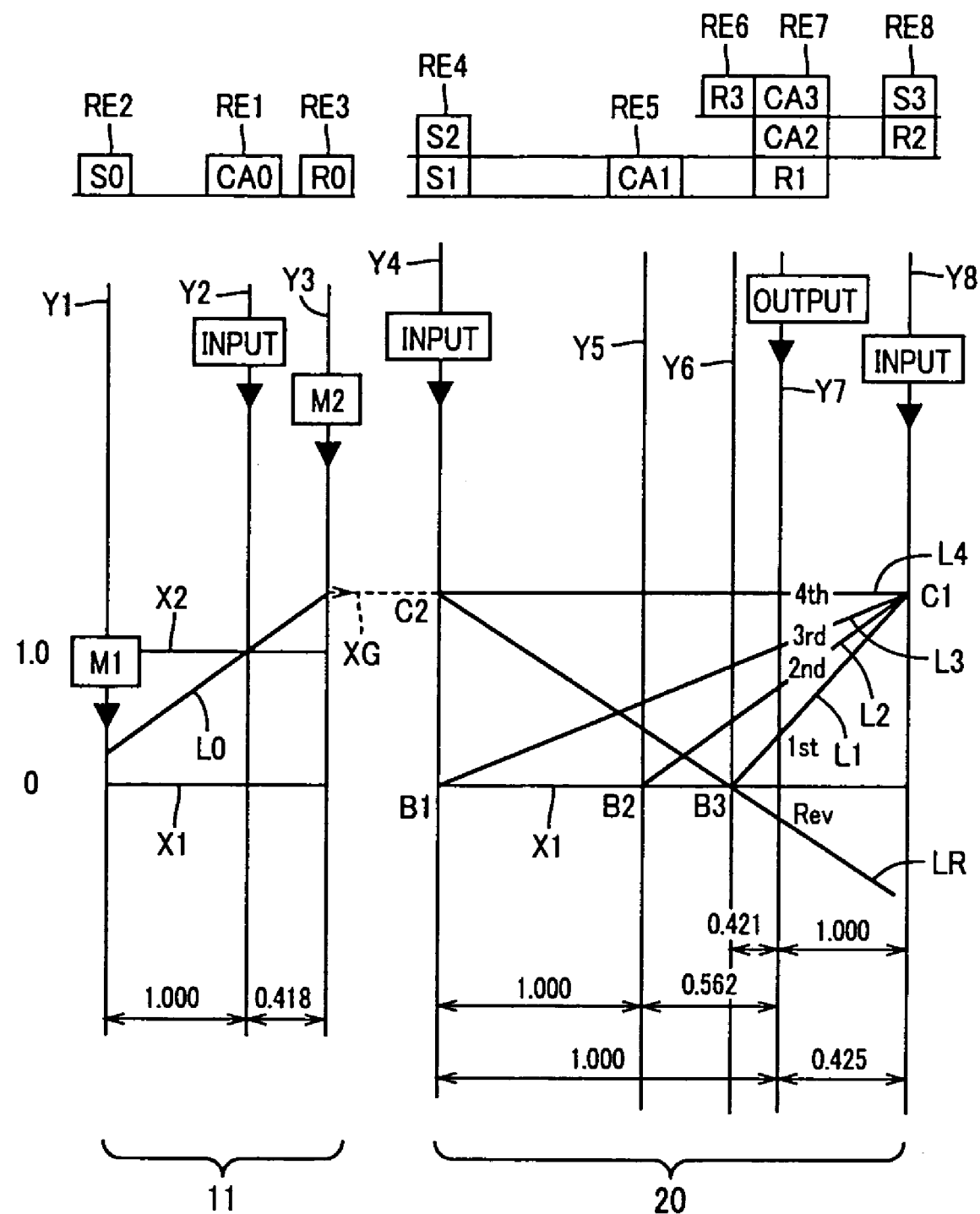
FIG. 3 is a collinear chart indicating relative rotating speeds of rotary elements of an electrically controlled differential portion and the automatic transmission portion of the drive system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the sun gear S0, a first rotary element (first element) RE1 in the form of the carrier CA0, and a third rotary element (third element) RE3 in the form of the ring gear R0. The distances between the adjacent ones of the vertical lines Y1, Y2 and Y3 are determined by the gear ratio ρ0 of the planetary gear set 24. That is, the distance between the vertical lines Y1 and Y2 corresponds to "1", while the distance between the vertical lines Y2 and Y3 corresponds to the gear ratio ρ0. Further, five vertical lines Y4, Y5, Y6, Y7 and Y8 corresponding to the transmission portion 20 respectively represent the relative rotating speeds of a fourth rotary element (fourth element) RE4 in the form of the first and second sun gears S1, S2 integrally fixed to each other, a fifth rotary element (fifth element) RE5 in the form of the first carrier CA1, a sixth rotary element (sixth element) RE6 in the form of the third ring gear R3, a seventh rotary element (seventh element) RE7 in the form of the first ring gear R1 and second and third carriers CA2, CA3 that are integrally fixed to each other, and an eighth rotary element (eighth element) RE8 in the form of the second ring gear R2 and third sun gear S3 integrally fixed to each other. The distances between the adjacent ones of the vertical lines are determined by the gear ratios ρ1, ρ2 and ρ3 of the first, second and third planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the first, second and third planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (carrier CA0) of the planetary gear set 24 is integrally fixed to the input shaft 14 (engine 8), and the second rotary element RE2 is fixed to the first electric motor M1, while the third rotary element RE3 (ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the sun gear S0 and the ring gear R0 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the sun gear S0, that is, the rotating speed of the first, electric motor M1, which is represented by a point of intersection between the straight line L0 and the vertical line Y1, is raised or lowered by controlling the engine speed $N_E$, so that the rotating speed of the carrier CA0 represented by a point of intersection between the straight line L0 and the vertical line Y2, if the rotating speed of the ring gear R0 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the sun gear S0 is made equal to the engine speed $N_E$, the straight line L0 is aligned with the horizontal line X2, so that the ring gear R0, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the sun gear S0 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed NE is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
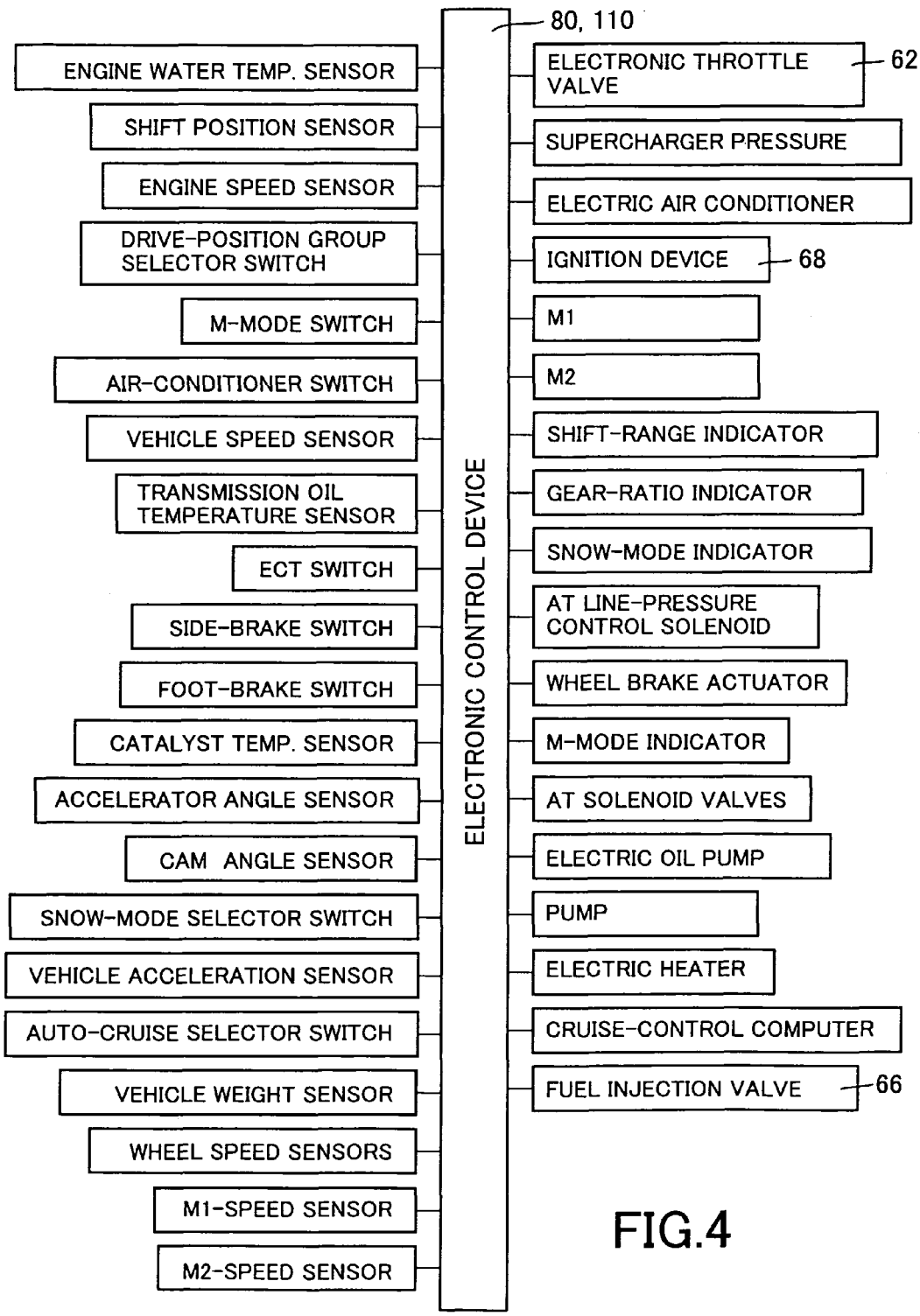
FIG. 4 is a view indicating input and output signals of an electronic control device serving as the control apparatus according to the embodiment of this invention to control the drive system of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions (shift positions) $P_{SH}$ of a manually operable shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output shaft 22; a signal indicative of a temperature $T_{OIL}$ of a working fluid or oil of the automatic transmission portion 20; a signal indicative of an operated state of a side brake; a signal indicative of an operated state of a foot brake pedal; a signal indicative of a temperature of a catalyst; a signal indicative of a required amount of an output of the vehicle in the form of an amount of operation (an angle of operation) $A_{CC}$ of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$, where appropriate); a signal indicative of a rotating speed $N_{M2}$ of the second electric motor M2 (hereinafter referred to as second electric motor speed $N_{M2}$, where appropriate); and a signal indicative of an amount of electric energy SOC stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; signals to operate wheel brake actuators; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
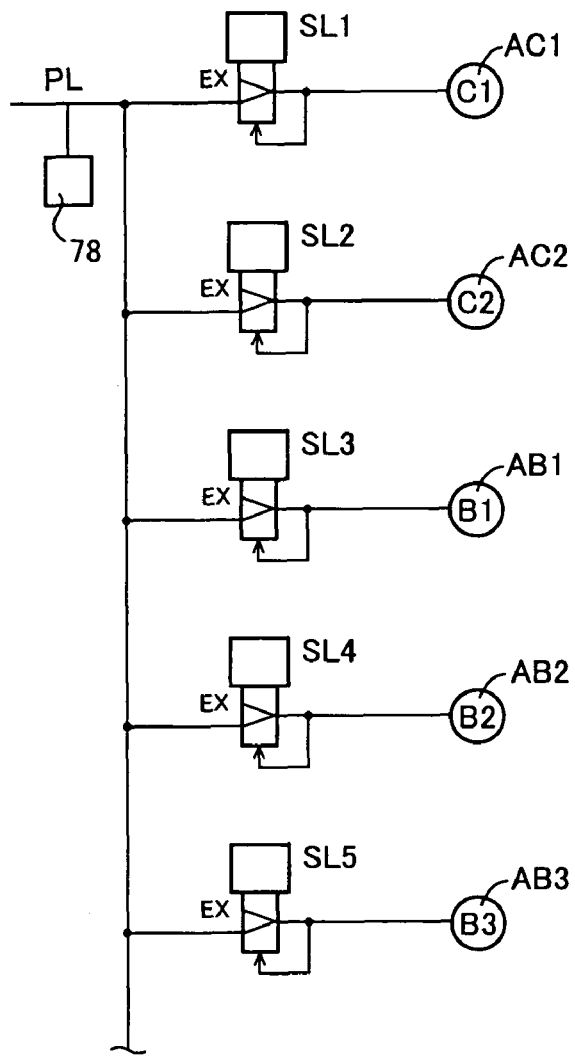
FIG. 5 is a circuit diagram showing hydraulic actuators provided in a hydraulic control unit, for operating clutches C and brakes B incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
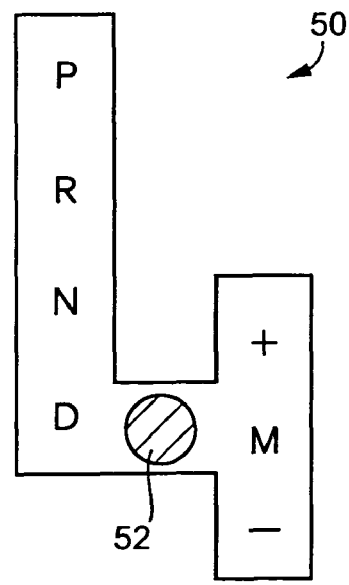
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of: a parking position P for placing the transmission mechanism 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the transmission mechanism 10 in the neutral state; an automatic forward-drive shifting position (forward-drive position) D for establishing an automatic shifting mode; and the above-indicated manual forward-drive shifting position M for establishing a manual shifting mode. In the automatic shifting mode, the overall speed ratio γT is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Referring to the functional block diagram of FIG. 7, the electronic control device 80 includes a step-variable shifting control portion 82, a hybrid control portion 84, a speed-ratio determining portion 90, a shifting-action determining portion 92, an internal-combustion-engine-state determining portion 94, and an internal-combustion-engine control portion 96. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual vehicle running speed V and the actual output torque $T_{OUT}$ of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal 74 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio γT of the transmission mechanism 10, so that the engine 8 is operated according to a stored highest fuel-economy curve (fuel-economy map or relation) indicated by thick solid line in FIG. 9 The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 11, so as to obtain the target value of the overall speed ratio γT, so that the overall speed ratio γT can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant.

To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control portion 84 changes the first electric motor speed $N_{M1}$ in a direction opposite to a direction of change of the second electric motor speed $N_{M2}$ due to the shifting action of the automatic transmission portion 20.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state. For example, the hybrid control portion 84 establishes the motor-drive mode, when the operating efficiency of the engine 8 is relatively low, or when the vehicle speed V is comparatively low or when the vehicle is running in a low-load state. For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

The hybrid control portion 84 functions as regeneration control means for operating the second electric motor M2 as the electric generator with a kinetic energy of the running vehicle, that is, with a drive force transmitted from the drive wheels 34 toward the engine 8, during coasting of the vehicle with the accelerator pedal 74 placed in the non-operated position, or during brake application to the vehicle with hydraulically operated wheel brakes 86 for the drive wheels 34, which are shown in FIG. 7. An electric energy generated by the second electric motor M2 is stored in the electric-energy storage device 56 through the inverter 54, for improving the fuel economy of the vehicle. The amount of electric energy to be generated by the second electric motor M2 is determined on the basis of the electric energy amount SOC stored in the electric-energy storage device 56, and a desired proportion of a regenerative braking force produced by the second electric motor M2 operated as the electric generator, with respect to a total braking force which corresponds to the operating amount of a brake pedal and which consists of the regenerative braking force and a hydraulic braking force produced by the hydraulically operated wheel brakes 86.

The collinear chart of FIG. 12, which shows the electrically controlled differential portion 11 (between the vertical lines Y1 and Y3) of the drive system, which corresponds to that of FIG. 3, explains a problem solved by control routines illustrated in FIGS. 10 and 11, which will be described. It will be understood from the collinear chart of FIG. 12 that a drop of the second electric motor speed $N_{M2}$ (which is the input speed of the automatic transmission portion 20) from a point F0 to a point F1 due to a decrease of the speed ratio γ of the automatic transmission portion 20 causes a rise of the first electric motor speed $N_{M1}$ from a point G0 to a point G1 while the engine speed $N_E$ is held constant at a point E0. Where the engine speed $N_E$ is held substantially constant, an abnormal shift-up action of the automatic transmission portion 20 due to a failure of the relevant solenoid valve or any other abnormality may cause an abnormal or excessive rise of the first electric motor speed $N_{M1}$, depending upon the engine speed $N_E$ and the two gear positions between which the shift-up action takes place. This abnormal rise of the first electric motor speed $N_{M1}$ adversely influences the durability of the first electric motor M1.

As described below in detail, the control apparatus in the form of the electronic control device 80 according to the first embodiment is configured to reduce or eliminate a risk of the adverse influence of an abnormal shifting action of the automatic transmission portion 20 due to a failure of the relevant solenoid valve or any other abnormality, on the durability of the first electric motor M1.

Referring back to the functional block diagram of FIG. 7, the speed-ratio determining portion 90 is configured to specify the kind of a shifting action of the automatic transmission portion 20, that is, to estimate the two gear positions from and to which the automatic transmission portion 20 is shifted. For example, the speed-ratio determining portion 90 can estimate the two gear positions of the automatic transmission portion 20, by detecting an increase or decrease of the rotating speed $N_{18}$ of the power transmitting member 18 (which is the input shaft of the automatic transmission portion 20) after a moment of initiation of the shifting action, and the rate of change of the rotating speed $N_{18}$. In the event of wire disconnection or any other failure of solenoid valves for controlling the relevant clutches C and brakes B of the automatic transmission portion 20, the automatic transmission portion 20 may undergo a shifting action not according to the shifting boundary line map of FIG. 8. In this event, too, the speed-ratio determining portion 90 can estimate the two gear positions of the automatic transmission portion 20 relating to the shifting action, on the basis of the detected rotating speed $N_{18}$.

The speed-ratio determining portion 90 determines, on the basis of the estimated two gear positions, whether the shifting action of the automatic transmission portion 20 is a stepping shift-up action. This determination is made by determining (a) whether the shifting action in question is a stepping shifting action between two gear positions which are not next to each other, for example, between the first and third gear positions, and (b) whether the stepping shifting action is a shift-up action (e.g., from the first gear position to the third gear position) which causes a drop of the speed ratio γ of the automatic transmission portion 20. When these two determinations (a) and (b) are both affirmative, the speed-ratio determining portion 90 obtains an affirmative determination that the shifting action in question is a stepping shift-up action. When either of the two determinations (a) and (b) is negative, the speed-ratio determining portion 90 obtains a negative determination that the shifting action in question is not a stepping shift-up action.

Figure 8:
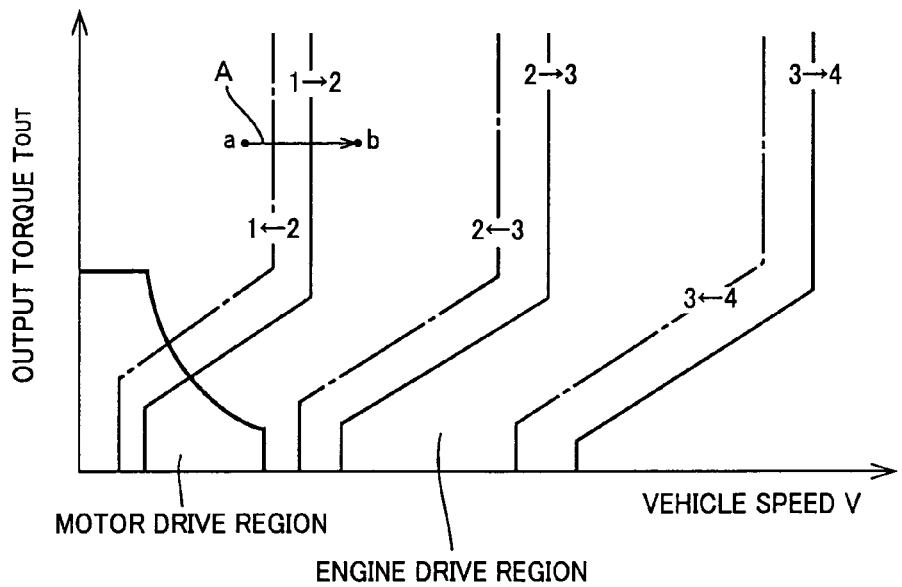
FIG. 8 is a view illustrating an example of a stored shifting boundary line map used for determining a shifting action of the automatic transmission portion, and an example of a stored drive-power-source switching boundary line map used for switch a vehicle drive mode between an engine drive mode and a motor drive mode, the shifting and switching boundary line maps being defined in the same two-dimensional coordinate system, in relation to each other.

If the affirmative determination is obtained by the speed-ratio determining portion 90, the shifting-action determining portion determines whether the stepping shift-up action of the automatic transmission portion 20 is an abnormal shifting action not effected according to the shifting boundary line map of FIG. 8. For example, the abnormal shifting action takes place due to wire disconnection of a solenoid valve for controlling the relevant clutches C and brakes B to perform a normal shifting action, or due to any other abnormality of the automatic transmission portion 20. The determination as to whether the stepping shift-up action is an abnormal shifting action is made on the basis of output signals of hydraulic pressure switches provided in the hydraulic control unit 70, any signal indicative of a fail-safe operation relating to the automatic transmission portion 20, an output signal of a wire disconnection detector switch, and/or signals indicative of relationships between shifting command signals received by the hydraulic control unit 70 from the step-variable shifting control portion 82 according to the shifting boundary line map of FIG. 8 and detected actual changes of parameters relating to the shifting action. If the speed ratio of the estimated gear position established by the stepping shift-up action is lower than that of the gear position normally established according to the shifting boundary line map of FIG. 8, the shifting-action determining portion 92 determines that the stepping shift-up action is an abnormal shifting action. Where the vehicle speed V is raised from a point "a" to a point "b" as indicted by an arrow-headed line A in FIG. 8, the automatic transmission portion 20 is normally shifted up from the first gear position to the second gear position. If the automatic transmission portion 20 is actually shifted up from the first gear position to the third gear position having a lower speed ratio than the normally established second gear position, the shifting-action determining portion 92 determines that the stepping shift-up action is an abnormal shifting action. Described in connection with the speed ratio γ of the automatic transmission portion 20 (rotating speed $N_{18}$ of the power transmitting member 17/rotating speed $N_{OUT}$ of the output shaft 22), the normal stepping shift-up action from the first gear position to the second gear position causes a change of the speed ratio from γ1 to γ2, while the abnormal stepping shift-up action from the first gear position to the third gear position causes a change of the speed ratio from γ1 to γ3. Therefore, the stepping shift-up action can be determined to be abnormal if the actual amount (γ1-γ3) of change of the speed ratio is larger than the normal amount (γ1-γ2) of change. In comparing the actual amount of change with the normal amount of change, the normal amount may be made larger than a nominal value by an amount corresponding to an amount of detection error of speed sensors used to detect the rotating speeds $N_{18}$ and $N_{OUT}$. It is noted that the automatic transmission portion 20 may undergo an abnormal stepping shift-down action involving an increase of the speed ratio γ. However, the abnormal stepping shift-down action does not cause a rise of the first electric motor speed $N_{M1}$ as compared with the normal stepping shift-down action. In this respect, the shifting-action determining portion 92 does not determine the abnormal stepping shift-down action as an abnormal shifting action.

The internal-combustion-engine-state determining portion 94 is configured to determine whether the vehicle is placed in a power-on state in which the operation amount $A_{CC}$ of the accelerator pedal is larger than a predetermined upper limit $X_{ACC}$ stored in a memory. In the power-on state, the engine 8 tends to operate at a high speed, causing an excessive rise of the first electric motor speed $N_{M1}$. The determination as to whether the vehicle is placed in the power-on state may be made by determining whether the opening angle $\theta_{TH}$ of the electronic throttle valve 62 is larger than a predetermined upper limit, rather than whether the operation amount $A_{CC}$ of the accelerator pedal is larger than a predetermined upper limit $X_{ACC}$. The internal-combustion-engine control portion 96 changes or selects the amounts of reduction of the engine speed $N_E$ and torque $T_E$, on the basis of a result of the determination by the internal-combustion-engine-state determining portion 94, as described below. In this respect, the predetermined upper limit $X_{ACC}$ of the operation amount $A_{CC}$ of the accelerator pedal is considered as a threshold for the selection of the amount of reduction of the engine speed $N_E$ and torque $T_E$.

Figure 9:
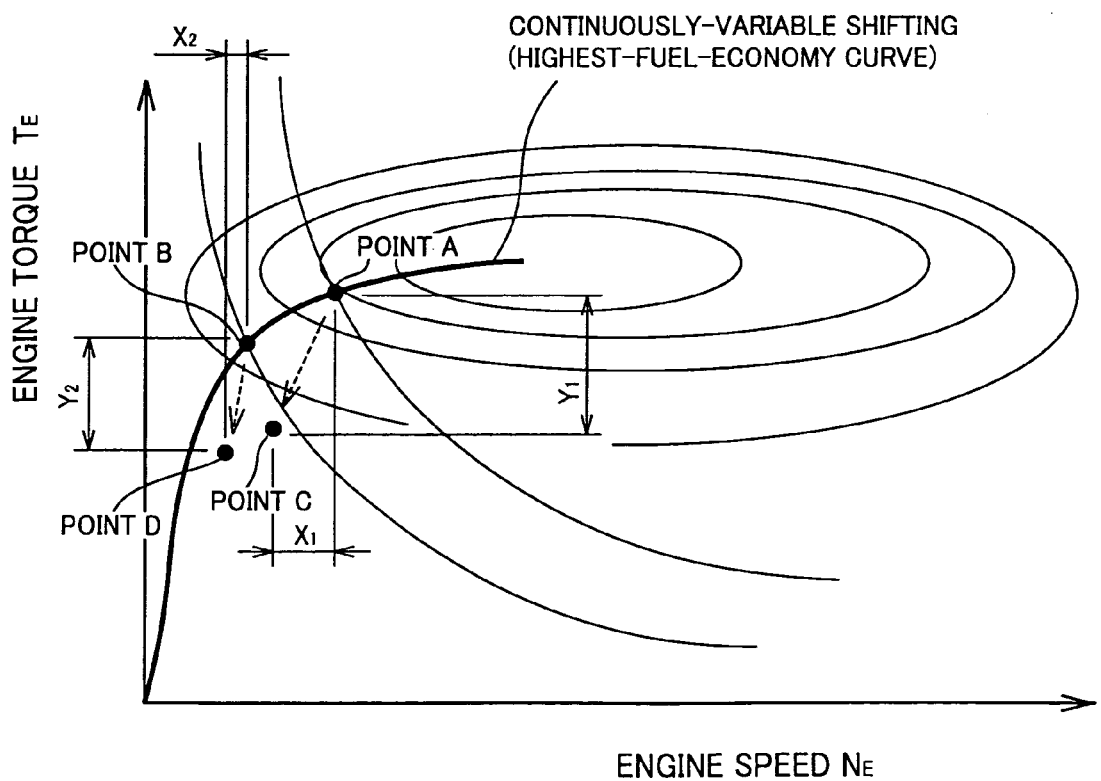
FIG. 9 is a view indicating a highest fuel-economy curve of an engine and explaining a portion of a control routine of FIG. 10.

If the affirmative determinations are obtained by both the shift-action determining portion 92 and the internal-combustion-engine-state determining portion 94, the internal-combustion-engine control portion 96 changes the operating state of the engine 8 so as to reduce both the engine speed $N_E$ and the engine torque $T_E$, such that an operating point of the engine 8 defined by the engine speed $N_E$ and torque deviates from the highest fuel-economy curve indicated in FIG. 9. For example, the operating state of the engine 8 is changed by reducing the opening angle $\theta_{TH}$ of the electronic throttle valve 62, so as to move the operating point. For instance, the operating point indicative of the operating state of the engine 8 is moved from a point A lying on the highest fuel-economy curve to a point C which deviates from the highest fuel-economy curve and at which the engine speed $N_E$ and torque $T_E$ are lower or smaller than at the point A.

If the negative determination is obtained by the internal-combustion-engine-state determining portion 94 while the affirmative-determination is obtained by the shifting-action determining portion 92, the internal-combustion-engine control portion 96 changes the operating state of the engine 8 so as to reduce both the engine speed $N_E$ and the engine torque $T_E$, as in the above-described case, such that the operating point of the engine 8 deviates from the highest fuel-economy curve. For example, the operating point is moved from a point B lying on the highest fuel-economy curve to a point D which deviates from the highest fuel-economy curve and at which the engine speed $N_E$ and torque $T_E$ are lower or smaller than at the point B. It will be understood from FIG. 9 that an amount of reduction $X_1$ of the engine speed $N_E$ and an amount of reduction $Y_1$ of the engine torque $T_E$ when the operating point is moved from the point A to the point C according to the affirmative determination by the internal-combustion-engine-state determining portion 94 are larger than an amount of reduction $X_2$ of the engine speed $N_E$ and an amount of reduction $Y_2$ of the engine torque $T_E$ when the operating point is moved from the point B to the point D according to the negative determination by the internal-combustion-engine-state determining portion 94.

If the negative determination is obtained by the shifting-action determining portion 92, the internal-combustion-engine control portion 96 controls the operating state of the engine 8 such that the operating point moves on the highest fuel-economy curve, for example, such that the operating point lies at the point A or B.

The predetermined upper limit $X_{ACC}$ of the operating amount $A_{CC}$ of the accelerator pedal may be determined such that the abnormal stepping shift-up action of the automatic transmission portion 20 does not have a risk of an excessive rise of the first electric motor speed $N_{M1}$ that adversely influences the durability of the first electric motor M1 when the operating amount $A_{CC}$ is smaller than the determined upper limit $X_{ACC}$. In this case, the internal-combustion-engine control portion 96 moves the operating point to a point not lying on the highest fuel-economy curve, for example, from the point A to the point C, to reduce both the engine speed $N_E$ and the engine torque $T_E$, only when the accelerator pedal operation amount $A_{CC}$ is larger than the predetermined upper limit $X_{ACC}$.

Referring to the flow chart of FIG. 10, there will be described a control routine executed by the electronic control device 80 according to the present first embodiment, for reducing or eliminating an risk of an adverse influence of an abnormal shifting action of the automatic transmission portion 20 on the durability of the first electric motor M1. This control routine is repeatedly executed with an extremely short cycle time of several milliseconds to several tens of milliseconds.

Figure 10:
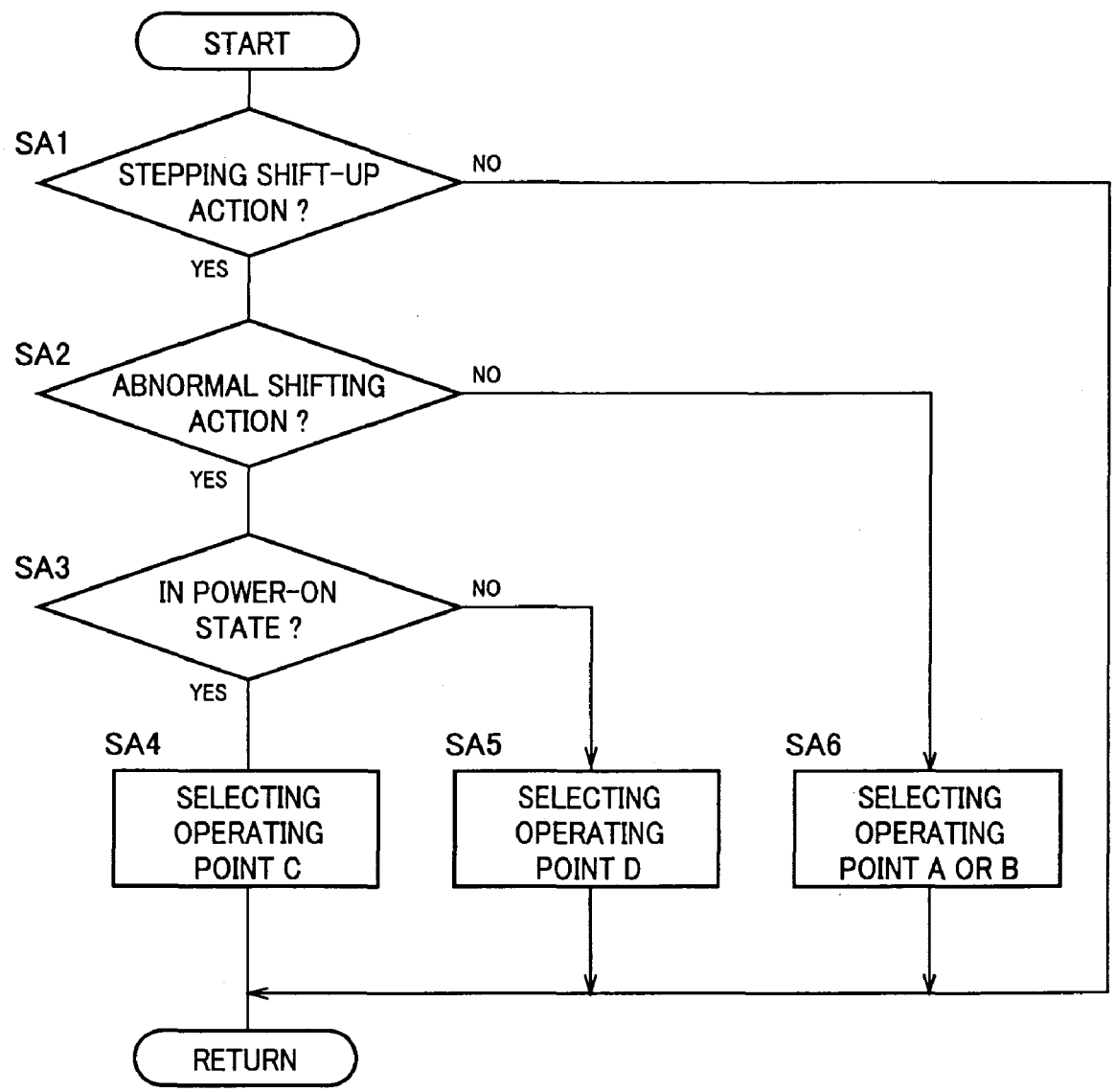
FIG. 10 is a flow chart illustrating the control routine executed by the electronic control device of FIG. 4 according to a first embodiment of this invention, for reducing or eliminating a risk of an adverse influence of an abnormal shifting action of the automatic transmission portion on the durability of a first electric motor.

The control routine of FIG. 10 is initiated with step SA1 corresponding to the speed-ratio determining portion 90, to determine whether the automatic transmission portion 20 undergoes a stepping shift-up action, namely, whether the above-described affirmative determinations (a) and (b) are obtained, as described above in detail with respect to the speed-ratio determining portion 90. If the affirmative determination is obtained in step SA1, the control flow goes to step SA2. If the negative determination is obtained in step SA1, one cycle of execution of the present control routine is terminated.

In step SA2 corresponding to the shifting-action determining portion 92, the determination is made as to whether the stepping shift-up action of the automatic transmission portion 20 is an abnormal shifting action not according to the shifting boundary line map of FIG. 8, as described above in detail with respect to the shifting-action determining portion 92. If the affirmative determination is obtained in step SA2, the control flow goes to step SA3. If the negative determination is obtained in step SA2, the control flow goes to step SA6.

In step SA3 corresponding to the internal-combustion-engine-state determining portion 94, the determination is made as to whether the vehicle is placed in the power-on state in which the accelerator pedal operation amount $A_{CC}$ is larger than the upper limit $X_{ACC}$. If the affirmative determination is obtained in step SA3, the control flow goes to step SA4. If the negative determination is obtained in step SA3, the control flow goes to step SA5.

Step SA4 is implemented to move the operating point of the engine 8 to a point which deviates from the highest fuel-economy curve of FIG. 9 and at which the engine speed $N_E$ and torque $T_E$ are both lower or smaller that at the present point, for example, from the point A to the point C.

Step SA5 is implemented to move the operating point of the engine 8 to a point which deviates from the highest fuel-economy curve of FIG. 9 and at which the engine speed $N_E$ and torque $T_E$ are both lower or smaller that at the present point, as in step SA4. For example, the operating point is moved from the point B to the point D. It is noted that the movement of the operating point in step SA5 causes larger amounts of reduction of the engine speed $N_E$ and torque $T_E$ than the movement of the operating point in step SA4.

In step SA6, the operating point of the engine 8 is moved on the highest fuel-economy curve of FIG. 9. For example, the operating point A or B is selected. It will be understood that the steps SA4-SA6 correspond to the internal-combustion-engine control portion 96.

The control apparatus in the form of the electronic control device 80 according to the first embodiment has the following advantages (A1)-(A10).

(A1) The electronic control device 80 includes the shifting-action determining portion 92 configured to determine whether a shifting action of the automatic transmission portion 20 is abnormal or not, and the internal-combustion-engine control portion 96 which is operated when the shifting-action determining portion 92 determines that the shifting action of the automatic transmission portion 20 is abnormal and which is configured to change the operating state of the engine 8. A change of the operating state of the engine 8 reduces or eliminates a risk of an abnormal or excessive rise of the operating speed $N_{M1}$ of the first electric motor M1 due to the abnormal shifting action of the automatic transmission portion 20, which rise would adversely influence the durability of the first electric motor M1.

(A2) The upper limit $X_{ACC}$ of the operating amount $A_{CC}$ of the accelerator pedal may be determined such that the abnormal stepping shift-up action of the automatic transmission portion 20 does not have a risk of an excessive rise of the first electric motor speed $N_{M1}$ and a consequent adverse influence on the durability of the first electric motor M1 when the operating amount $A_{CC}$ is smaller than the determined upper limit $X_{ACC}$. In this case, the internal-combustion-engine control portion 96 moves the operating point to a point not lying on the highest fuel-economy curve, to reduce both the engine speed $N_E$ and the engine torque $T_E$, only when the accelerator pedal operation amount $A_{CC}$ is larger than the predetermined upper limit $X_{ACC}$. Thus, the operating state of the engine 8 can be adequately changed depending upon whether the accelerator pedal operation amount $A_{CC}$ is larger than the upper limit $X_{ACC}$ or not, so as to effectively reduce or eliminate the risk of an adverse influence of the abnormal shifting action of the automatic transmission portion 20 on the durability of the first electric motor M1.

(A3) The operating state of the engine 8 is changed to reduce the engine speed $N_E$ and engine torque $T_E$ by larger amounts when the operation amount $A_{CC}$ of the accelerator pedal is larger than the predetermined upper limit $X_{ACC}$, than when the operation amount $A_{CC}$ is not larger than the upper limit $X_{ACC}$, that is, when the vehicle is placed in the power-on state, than when the vehicle is not placed in the power-on state. Accordingly, the degree of reduction of the risk of an excessive rise of the operating speed $N_{M1}$ of the first electric motor M1 by changing the operating state of the engine 18 increases with an increase of the risk, so that the risk of the adverse influence of the abnormal shifting action of the automatic transmission portion 20 on the durability of the first electric motor M1 can be effectively reduced or eliminated.

(A4) The shifting-action determining portion 92 determines that the estimated stepping shift-up action of the automatic transmission portion 20 is abnormal when the amount of reduction of the speed ratio γ of the automatic transmission portion 20 caused by the stepping shift-up action is larger than the nominal value obtained where the automatic transmission portion 20 is normally operable. Thus, the internal-combustion-engine control portion 96 changes the operating state of the engine 8 only when there is a relatively high risk of an excessive rise of the operating speed $N_{M1}$ of the first electric motor M1, so that the control load of the electronic control device 80 can be reduced.

(A5) The operating state of the engine 8 is changed by the internal-combustion-engine control portion 96, so as to reduce the engine torque $T_E$, and the engine speed $N_E$ which determines the rotating speed $N_{IN}$ of the input shaft 14 of the differential portion 11. The reduction of the engine speed $N_E$ and engine torque $T_E$ results in reduction of the operating speed $N_{M1}$ of the first electric motor $N_{M1}$, thereby making it possible to reduce or eliminate the risk of an excessive rise of the first electric motor speed $N_{M1}$.

(A6) The shifting-action determining portion 92 is operated only when it is determined that the estimated stepping action of the automatic transmission portion 20 is a shift-up action which causes a drop of the speed ratio γ. Only when the shifting-action determining portion 92 determines that the stepping shift-down action is abnormal, the internal-combustion-engine control portion 96 changes the operating state of the engine 8 so as to reduce both the engine speed $N_E$ and engine toque $T_E$. Thus, the internal-combustion-engine control portion 96 does not change the operating state of the engine 8 so as to reduce both the engine speed $N_E$ and engine toque $T_E$ unless the stepping shift-down action of the automatic transmission portion 20 is estimated to take place, that is, unless there is a high possibility of an excessive rise of the first electric motor speed $N_{M1}$. Accordingly, the control load of the electronic control device 80 is reduced.

(A7) The differential portion 11 is operable as a continuously-variable transmission portion the speed ratio of which is electrically continuously variable, so that the differential portion 11 and the automatic transmission portions 20 cooperate to constitute a continuously variable transmission capable of smoothly changing the vehicle drive torque. It is noted that the differential portion 11 is operable not only as the electrically controlled transmission portion, but also as a step-variable transmission portion the speed ratio of which is variable in steps.

(A8) Since the automatic transmission portion 20 is a step-variable automatic transmission the speed ratio of which is automatically variable, the speed ratio of the automatic transmission portion 20 can be varied over a relatively wide range, and a burden on the vehicle operator in controlling the vehicular drive system can be reduced.

(A9) The speed-ratio determining portion 90 estimates the shifting action of the automatic transmission portion 20, and determines whether the estimated shifting action is a stepping shift-up action, so that the internal-combustion-engine control portion 96 may be operated prior to the completion of the shifting action. Accordingly, the internal-combustion-engine control portion 96 can control the operating state of the engine 8 at an earlier point of time than where the speed-ratio determining portion 90 makes the determination as to whether the shifting action is a stepping shift-up action, after the completion of the shifting action. Therefore, the risk of the adverse influence of the abnormal stepping shift-up action of the automatic transmission portion 20 on the durability of the first electric motor M1 can be effectively reduced or eliminated.

(A10) Since the output of the differential portion 11 is input to the automatic transmission portion 20, the output torque $T_E$ of the engine 8 which is increased by the automatic transmission portion 20 is not input to the differential portion 11. Accordingly, the required torque capacity of the differential portion 11 can be made smaller than when the output of the automatic transmission portion 20 is input to the differential portion 11, so that the differential portion 11 can be small-sized.

A second embodiment of this invention will be described. In the second embodiment, the same reference signs as used in the first embodiment will be used to identify the same elements.

Second Embodiment

The second embodiment uses an electronic control device 100 in place of the electronic control device 80. The electronic control device 100 includes an internal-combustion-engine-state determining portion 102 in place of the internal-combustion-engine control device 94, and the same speed-ratio determining portion 90, shifting-action determining portion 92 and internal-combustion-state control portion 96 as used in the first embodiment, as indicated in the functional block diagram of FIG. 7. Only a portion of the second embodiment which is different from the first embodiment will be described.

The internal-combustion-engine-state determining portion 102 is configured to determine whether the engine speed $N_E$ is equal to or higher than a predetermined upper limit $A_{NE}$ stored in a memory. The internal-combustion-engine control portion 96 changes or selects the amounts of reduction of the engine speed $N_E$ and engine torque $T_E$ on the basis of a result of the determination by the internal-combustion-engine-state determining portion 102. In this respect, the predetermined upper limit $A_{NE}$ of the engine speed $N_E$ is considered as a threshold for changing or selecting the amounts of reduction of the engine speed $N_E$ and torque $T_E$.

The internal-combustion-engine control portion 96 provided in this second embodiment is identical with that in the first embodiment, except in that the operating state or point of the engine 8 is controlled on the basis of the result of the determination by the internal-combustion-engine-state determining portion 102 rather than the internal-combustion-engine-state determining portion 94.

The predetermined upper limit $A_{NE}$ of the engine speed $N_E$ may be determined such that the abnormal stepping shift-up action of the automatic transmission portion 20 does not have a risk of an excessive rise of the first electric motor speed $N_{M1}$ that adversely influences the durability of the first electric motor M1 when the engine speed $N_E$ is lower than the determined upper limit $A_{NE}$. In this case, the internal-combustion-engine control portion 96 moves the operating point to a point not lying on the highest fuel-economy curve, for example, from the point A to the point C, to reduce both the engine speed $N_E$ and the engine torque $T_E$, only when the engine speed $N_E$ is equal to or higher than the predetermined upper limit $A_{NE}$.

Referring to the flow chart of FIG. 11, there will be described a control routine executed by the electronic control device 100 according to the second embodiment, for reducing or eliminating an risk of an adverse influence of an abnormal shifting action of the automatic transmission portion 20 on the durability of the first electric motor M1. This control routine is repeatedly executed with an extremely short cycle time of several milliseconds to several tens of milliseconds. Step SB3 of the present control routine of FIG. 11 is implemented in place of the step SA3 of the control routine of FIG. 10. Steps SB1, SB2, and SB4-SB6 of FIG. 11 are respectively identical with the steps SA1, SA2, and SA4-SA6 of FIG. 10. Only a portion of the control routine of FIG. 11 which is different from the control routine of FIG. 10 will be described.

If the affirmative determination is obtained in step SB2, the control flow goes to step SB3 corresponding to the internal-combustion-engine-state determining portion 102, to determine whether the engine speed $N_E$ is equal to or higher than the upper limit $A_{NE}$. If an affirmative determination is obtained in step SB3, the control flow goes to step SB4. If a negative determination is obtained in step SB3, the control flow goes to step SB5.

The control apparatus in the form of the electronic control device 100 according to the second embodiment has the following advantages (B1) and (B2), in addition to the advantages (A1) and (A4)-(A10) described above with respect to the first embodiment.

(B1) The operating state of the engine 8 is changed so as to reduce the engine speed $N_E$ and engine torque $T_E$ by larger amounts, than when the engine speed $N_E$ is equal to or higher than the upper limit $A_{NE}$, than when the engine speed $N_E$ is lower than the upper limit $A_{NE}$. Accordingly, the degree of reduction of the risk of an excessive rise of the operating speed $N_{M1}$ of the first electric motor M1 by changing the operating state of the engine 8 increases with an increase of the risk, Thus, the present second embodiment can effectively reduce or eliminate the risk of an adverse influence of the abnormal shifting action of the automatic transmission portion 20 on the durability of the first electric motor M1.

(B2) Where the predetermined upper limit $A_{NE}$ of the engine speed $N_E$ is determined such that the abnormal stepping shift-up action of the automatic transmission portion 20 does not have a risk of an excessive rise of the first electric motor speed $N_{M1}$ that adversely influences the durability of the first electric motor M1 when the engine speed $N_E$ is lower than the determined upper limit $A_{NE}$, the internal-combustion-engine control portion 96 changes the operating state of the engine 8 so as to reduce both the engine speed $N_E$ and the engine torque $T_E$, irrespective of the highest fuel-economy curve, only when the engine speed $N_E$ is equal to or higher than the upper limit $A_{NE}$ while the shifting action of the automatic transmission portion 20 is an abnormal stepping shift-up action that causes a drop of the speed ratio γ. Thus, the operating state of the engine 8 can be adequately changed depending upon whether the engine speed $N_E$ is higher or lower than the upper limit $A_{NE}$, making it possible to reduce or eliminate the risk of the adverse influence of the abnormal stepping shift-up action of the automatic transmission portion 20 on the durability of the first electric motor M1.

While the preferred embodiments of this invention have been described in detail by reference to the accompanying drawings, it is to be understood that the present invention may be otherwise embodied.

In the first embodiment, the internal-combustion-engine control portion 96 is configured to change or select the amounts of reduction of the engine speed $N_E$ and torque $T_E$ upon changing the operating state of the engine 8, depending upon whether the operation amount $A_{CC}$ of the accelerator pedal is larger than the predetermined upper limit $X_{ACC}$, or not. However, the internal-combustion-engine control portion 96 may be configured to change the operating state of the engine 8 such that the amounts of reduction of the engine speed $N_E$ (input speed of the differential portion 11) and the engine torque $T_E$ increase continuously or in steps with an increase of the accelerator pedal operation amount $A_{CC}$. In this case, the degree of reduction of the risk of an excessive rise of the first electric motor speed $N_{M1}$ increases with an increase of the risk, making it possible to effectively reduce or eliminate the risk of an adverse influence of the abnormal shifting action of the automatic transmission portion 20 on the durability of the first electric motor M1.

In the first embodiment, the internal-combustion-engine control portion 96 is configured to change or select the amounts of reduction of the engine speed $N_E$ and torque $T_E$ upon changing the operating state of the engine 8, depending upon whether the engine speed $N_E$ is higher or lower than the predetermined upper limit $A_{NE}$. However, the internal-combustion-engine control portion 96 may be configured to change the operating state of the engine 8 such that the amounts of reduction of the engine speed $N_E$ and the engine torque $T_E$ increase continuously or in steps with an increase of the engine speed $N_E$. In this case, the degree of reduction of the risk of an excessive rise of the first electric motor speed $N_{M1}$ increases with an increase of the risk, making it possible to effectively reduce or eliminate the risk of an adverse influence of the abnormal shifting action of the automatic transmission portion 20 on the durability of the first electric motor M1.

In the second embodiment, the amounts of reduction of the engine speed $N_E$ and engine torque $T_E$ by the internal combustion-engine control portion 96 are larger when the engine speed $N_E$ is equal to or higher than the upper limit $A_{NE}$, than when the engine speed NE is lower than the upper limit $A_{NE}$. However, the internal-combustion-engine control portion 96 may be configured to change the operating state of the engine 8 such that the amounts of reduction of the engine speed $N_E$ and engine torque $T_E$ increase with a decrease of the rotating speed $N_{18}$ of the power transmitting member 18 (which is the output shaft of the differential portion 11) after the shifting action of the automatic transmission portion 20 estimated by the speed-ratio determining portion 90.

In the illustrated first and second embodiments, the upper limits $X_{ACC}$ and $A_{NE}$ provided as the thresholds for determining the amounts of reduction of the engine speed $N_E$ and engine torque $T_E$ by the internal-combustion-engine control portion 96 are predetermined constants. However, the upper limits $X_{ACC}$ and $A_{NE}$ may be determined so as to decrease with an increase of the amount of reduction of the speed ratio γ of the automatic transmission portion 20 caused by the shifting action estimated by the speed-ratio determining portion 90. In this case, there is a higher opportunity of changing the operating state of the engine 8 such that the amounts of reduction of the engine speed $N_E$ and engine torque $T_E$ increase with an increase of the risk of an excessive rise of the first electric motor speed $N_{M1}$, than where the upper limits $X_{ACC}$ and $A_{NE}$ are constant values. Accordingly, the operating state of the engine 8 can be changed as needed, making it possible to effectively reduce or eliminate the risk of an adverse influence of the abnormal shifting action of the automatic transmission portion 20 on the durability of the first electric motor M1.

In the illustrated first and second embodiments, the internal-combustion-engine control portion 96 is operated when the affirmative determination is obtained by the speed-ratio determining portion 92, to change the operating point of the engine 8 to a point not lying on the highest fuel-economy curve, so as to reduce both the engine speed $N_E$ and the engine torque $T_E$. However, the operating state of the engine 8 may be changed so as to reduce one of the engine speed $N_E$ and the engine torque $T_E$.

In the power distributing mechanism 16 in the illustrated transmission mechanism 10, the carrier CA0 is fixed to the engine 8, and the sun gear S0 is fixed to the first electric motor M1 while the ring gear R0 is fixed to the power transmitting member 18. However, this arrangement is not essential. The engine 8, first electric motor M1 and power transmitting member 18 may be fixed to any other elements selected from the three elements CA0, S0 and R0 of the planetary gear set 24. For example, the power distributing mechanism 16 may be modified such that the carrier CA0 is fixed to the power transmitting member 18, and the sung gear S0 is fixed to the first electric motor M1 while the ring gear R0 is fixed to the engine 8. In this case, the first electric motor speed $N_{M1}$ increases with an increase of the rotating speed $N_{18}$ of the power transmitting member 18, so that a stepping shift-down action rather than a stepping shift-up action of the automatic transmission portion 20 may influence the durability of the first electric motor M1. In the illustrated first and second embodiments, the internal-combustion-engine control portion 96 is arranged to control the operating state of the engine 8 so as to lower its speed $N_E$ when a stepping shifting action of the automatic transmission portion 20 causes a drop of the speed ratio γ. Where the power distributing mechanism 16 is modified as described above, however, the internal-combustion-engine control portion 96 is configured to control the operating state of the engine 8 so as to raise its speed $N_E$ when a stepping shift-down action of the automatic transmission portion 20 takes place, that is, when a stepping action of the automatic transmission portion 20 causes a rise of the speed ratio γ.

Although the second electric motor M2 is connected to the power transmitting member 18 in the illustrated mechanism 10, the second electric motor M2 need not be provided.

In the first and second embodiments, the speed-ratio determining portion 90 is configured to estimate the gear position of the automatic transmission mechanism 20 which is established after the shifting action. However, the speed-ratio determining portion 90 need not estimate the gear position to be established, and may make the determination of the speed ratio of the gear position, after the shifting action is completed. In this case, too, it is possible to reduce the risk of the adverse influence of an abnormal shifting action of the automatic transmission portion 20 on the durability of the first electric motor M1.

In the illustrated transmission mechanism 10, the second electric motor M2 is connected directly to the power transmitting member 18. However, the second electric motor M2 may be connected to any portion of the power transmitting path between the differential portion 11 and the drive wheels 34, either directly or indirectly through a suitable transmission device.

Although the differential portion 11 of the illustrated transmission mechanism 10 functions as an electrically controlled continuously variable transmission the gear ratio γ0 of which is continuously variable from the minimum value $γ0_{min}$ to the maximum value $γ0_{max}$, the differential portion 11 may be modified such that its speed ratio γ0 is not variable continuously, but is variable in steps by utilizing its differential function. The present invention is applicable to a hybrid vehicle drive system including the differential portion modified as described above.

While the engine 8 is directly fixed to the input shaft 14 in the illustrated transmission mechanism 10, the engine 8 may be operatively connected to the input shaft 14 through any suitable member such as gears and a belt, and need not be disposed coaxially with the input shaft 14.

While the engine 8 and the differential portion 11 are connected directly to each other in the illustrated transmission mechanism 10, they may be connected to each other indirectly through a clutch.

In the illustrated transmission mechanism 10, the first electric motor M1 and the second rotary element RE2 are directly connected to each other, while the second electric motor M2 and the third rotary element RE3 are directly connected to each other. However, the first electric motor M1 may be connected to the second rotary element RE2 through a clutch or any other coupling device. Similarly, the second electric motor M2 may be connected to the third rotary element RE3 through a clutch or any other coupling device.

In the illustrated transmission mechanism 10, the second electric motor M2 is connected to the power transmitting member 18 which constitutes a part of the power transmitting path between the engine 8 and the drive wheels 34. However, the second electric motor M2 which is connected to the above-indicated power transmitting path (power transmitting member 18) may be connectable to the power distributing mechanism 16 through a clutch or any other coupling device, so that the differential state of the power distributing mechanism 16 can be controlled by controlling the operating state of the second electric motor M2 rather than the first electric motor M1.

In the illustrated transmission mechanism 10, the first and second electric motors M1, M2 are disposed coaxially with the input shaft 14 such that the first electric motor M1 is connected to the sun gear S0 while the second electric motor M2 is connected to the power transmitting member 18. However, this arrangement is not essential. For instance, the first electric motor M1 may be operatively connected to the sun gear S0 through gears, a belt or a speed reduction device, while the second electric motor M2 may be connected to the power transmitting member 18.

In the illustrated embodiment, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

While the power distributing mechanism 16 in the illustrated transmission mechanism 10 is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the power distributing mechanism 16 is constituted by two or more planetary gear sets, the engine 8, first and second electric motors M1, M2 and power transmitting member 18 are operatively connected to respective rotary elements of the planetary gear sets, and the power distributing mechanism 16 is switched between its step-variable and continuously-variable shifting states, by controlling the clutches C and brakes B connected to the respective rotary elements of the planetary gear sets.

In the illustrated transmission mechanism 10, the differential portion 11 and the automatic transmission portion 20 are connected in series to each other. However, the control apparatus according to the present invention is equally applicable to a drive system in which an electrically controlled differential portion and a step-variable transmission portion are not mechanically independent of each other, provided the drive system as a whole has an electric differential function, and a shifting function different from the electric differential function. Further, the electrically controlled differential portion and the step-variable transmission portion may be suitably disposed in a desired order in the drive system. Namely, the automatic transmission portion 20 is required to constitute a part of the power transmitting path between the engine 8 and the drive wheels 34.

In the illustrated transmission mechanism 10, the automatic transmission portion 20 is a transmission portion functioning as a step-variable automatic transmission. However, the automatic transmission portion 20 may be replaced by a continuously-variable transmission (CVT).

Figure 11:
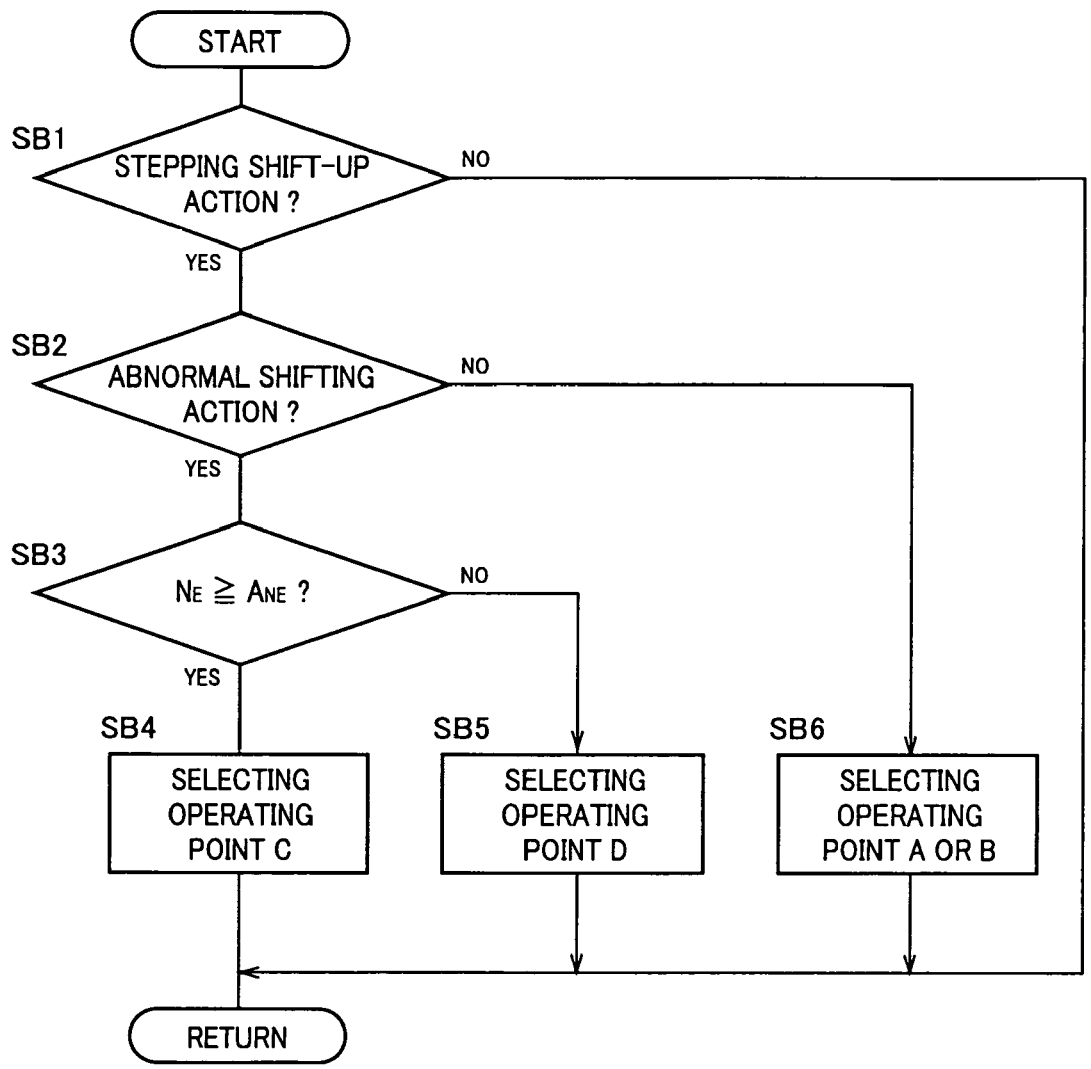
FIG. 11 is a flow chart illustrating a control routine executed by the electronic control device of FIG. 4 according to a second embodiment of the invention, for reducing or eliminating a risk of an adverse influence of an abnormal shifting action of the automatic transmission portion on the first electric motor.
Figure 12:
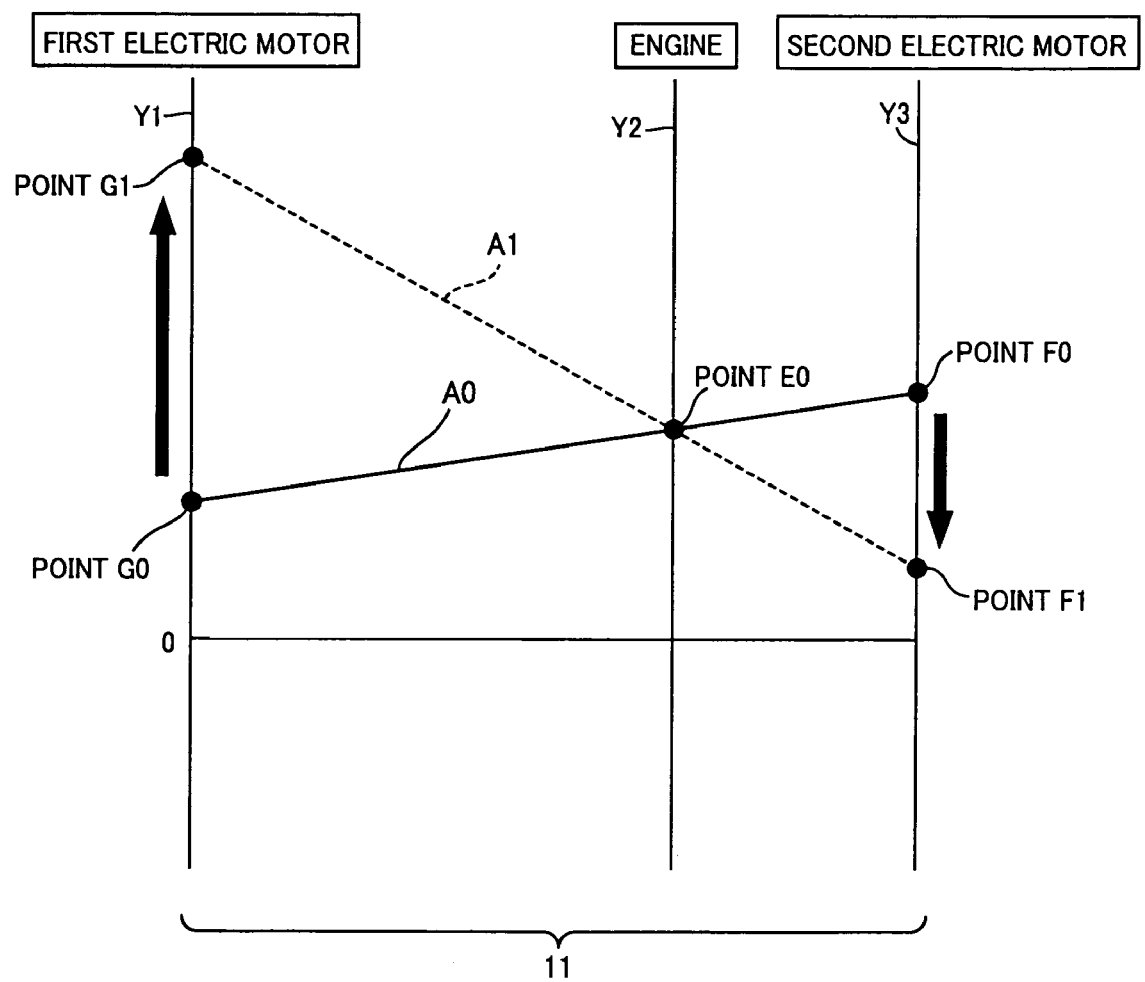
FIG. 12 is a collinear chart of the electrically controlled differential portion of the drive system, which corresponds to that of FIG. 3, for explaining a problem solved by the control routines illustrated in FIGS. 10 and 11.

The control apparatus of the present invention may be modified to execute combinations of the control routines of FIGS. 10 and 11 of the first and second embodiments, in a predetermined order.

What is claimed is:

1. A control apparatus for a vehicular drive system including (a) an internal combustion engine, and (b) a first transmission portion and a second transmission portion disposed in a power transmitting path between the internal combustion engine and a drive wheel of a vehicle, the first transmission portion having an electrically controlled differential portion which includes a first electric motor and a differential state of which is controllable by controlling an operating state of the first electric motor, said control apparatus comprising:

a shifting-action determining portion configured to determine that a shifting action of the second transmission portion is abnormal when an amount of change of a speed ratio of the second transmission portion caused by the shifting action is larger than a nominal value obtained where the second transmission portion is normally operable; and an internal-combustion-engine control portion configured to change an operating state of the internal combustion engine so as to reduce a rotation speed of the first electric motor when it is determined that the shifting action of the second transmission portion is abnormal, wherein the internal-combustion-engine control portion changes the operating state of the internal combustion engine when an amount of opening of a throttle valve of the internal combustion engine or an amount of displacement of a vehicle accelerating member is larger than a predetermined upper limit while it is determined that the shifting action of the second transmission portion is abnormal.

2. The control apparatus according to claim 1, wherein the internal-combustion-engine control portion changes the operating state of the internal combustion engine such that an amount of reduction of an input speed of the first transmission portion increases with an increase of the amount of opening of the throttle valve or the amount of displacement of the vehicle accelerating member.

3. The control apparatus according to claim 1, wherein the internal-combustion-engine control portion changes the operating state of the internal combustion engine such that an amount of reduction of the input speed of the first transmission portion increases with an increase of the input speed.

4. The control apparatus according to claim 1, wherein the internal-combustion-engine control portion changes the operating state of the internal combustion engine when an input speed of the first transmission portion is equal to or higher than a predetermined upper limit while it is determined that the shifting action of the second transmission portion is abnormal.

5. The control apparatus according to claim 1, wherein the predetermined upper limit of the operating speed of the first transmission portion is determined such that the predetermined upper limit decreases with an increase of an amount of reduction of the speed ratio of the second transmission portion.

6. The control apparatus according to claim 1, wherein the internal-combustion-engine control portion changes the operating state of the internal combustion engine when it is determined that a shift-up action of the second transmission portion which causes a drop of the speed ratio of the second transmission portion is abnormal.

7. The control apparatus according to claim 1, wherein the vehicular drive system further includes (c) a second electric motor, and the electrically controlled differential portion includes a planetary gear mechanism having a first rotary element operatively connected to the internal combustion engine, a second rotary element operatively connected to the first electric motor, and a third rotary element operatively connected to the second electric motor and the second transmission portion, and wherein the electrically controlled differential portion is operable as an electrically controlled continuously-variable transmission portion, a speed ratio of which is electrically continuously variable while the first and second electric motors are electrically connected to each other.

8. The control apparatus according to claim 1, wherein the second transmission portion is a step-variable automatic transmission, a speed ratio of which is automatically variable.

9. The control apparatus according to claim 1, wherein an output of the first transmission portion is input to the second transmission portion.

* * * * *